United States Patent
Park et al.

(10) Patent No.: US 7,139,051 B2
(45) Date of Patent: *Nov. 21, 2006

(54) REFLECTIVE LIQUID CRYSTAL DISPLAY OF HIGH APERTURE RATIO, HIGH TRANSMITTANCE AND WIDE VIEWING ANGLE

(75) Inventors: In Cheol Park, Seoul (KR); Seung Hee Lee, Kyoungki-do (KR); Bong Gyu Roh, Kyoungki-do (KR)

(73) Assignee: Boe-Hydis Technology Co., Ltd., Kyoungki-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/746,512

(22) Filed: Dec. 24, 2003

(65) Prior Publication Data
US 2004/0227875 A1  Nov. 18, 2004

Related U.S. Application Data

(63) Continuation of application No. 09/345,270, filed on Jun. 30, 1999, now abandoned.

(30) Foreign Application Priority Data
Jun. 30, 1998  (KR) .................................. 98-25783

(51) Int. Cl.
*G02F 1/1335* (2006.01)
*G02F 1/1343* (2006.01)

(52) U.S. Cl. ...................... 349/113; 349/141
(58) Field of Classification Search ................ 349/141, 349/113–114
See application file for complete search history.

(56) References Cited

U.S. PATENT DOCUMENTS

| | | | | |
|---|---|---|---|---|
| 3,912,369 | A * | 10/1975 | Kashnow | 349/117 |
| 6,317,183 | B1 * | 11/2001 | Komatsu | 349/141 |
| 6,522,380 | B1 * | 2/2003 | Lee et al. | 349/141 |
| 6,781,660 | B1 * | 8/2004 | Hiroshi | 349/141 |

* cited by examiner

*Primary Examiner*—Dung T. Nguyen
(74) *Attorney, Agent, or Firm*—Ladas & Parry LLP

(57) ABSTRACT

Disclosed is a reflective liquid crystal display. The present invention provides a reflective liquid crystal display comprising: a lower substrate and an upper substrate opposed with a selected distance; a liquid crystal layer sandwiched between the lower and upper substrates and comprising a plurality of liquid crystal molecules; a gate bus line and a data bus line formed on the lower substrate to define a pixel; a counter electrode and a pixel electrode formed at an inner surface of the lower substrate, wherein both electrodes are formed with a selected distance and width so that most of the liquid crystal molecules in upper portions of those electrodes are sufficiently driven by forming a fringe field between said counter and pixel electrodes; a thin film transistor provided adjacent to an intersection of the gate bus line and the data bus line and transmitting a signal of the data bus line into the pixel electrode when the gate bus line is selected; a polarizing plate disposed at an outer surface of the upper substrate; a reflecting plate disposed at an outer surface of the lower substrate; and a quarter wave plate sandwiched between the quarter wave plate and the lower substrate, or between the polarizing plate an the upper substrate, wherein both counter and pixel electrodes are made of a transparent conductor, wherein a distance between the upper and lower substrates is greater in length than a distance between the counter and pixel electrodes.

22 Claims, 12 Drawing Sheets

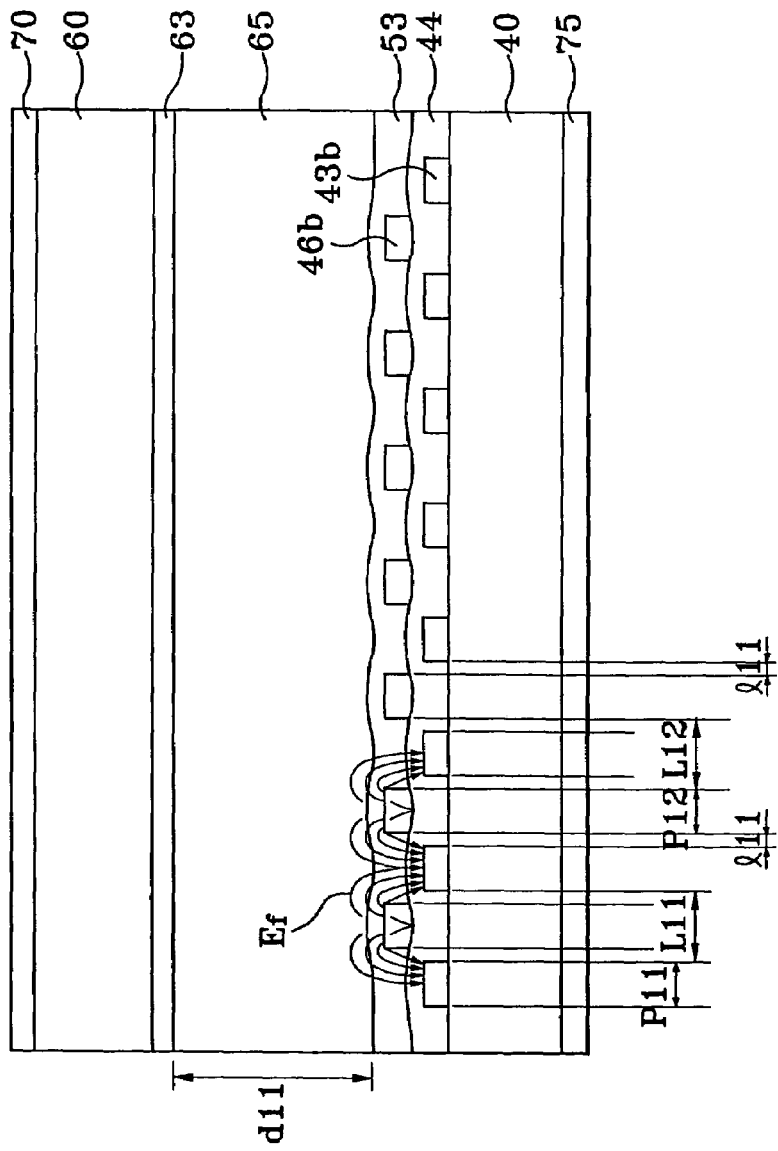

REFLECTIVE LIQUID CRYSTAL DISPLAY OF HIGH APERTURE RATIO, HIGH TRANSMITTANCE AND WIDE VIEWING ANGLE

FIELD OF THE INVENTION

The present invention generally relates to a reflective liquid crystal display (LCD) and more particularly to a reflective LCD having high aperture ratio, high transmittance and wide viewing angle.

BACKGROUND OF THE INVENTION

The reflective LCD generally uses natural light as a light source rather than additional light source such as back-light.

The theory of the reflective LCD can be summarized by that a natural light is radiated from an upper substrate, and then the light is reflected via a reflecting plate disposed at a bottom position of a lower substrate., at this time, the light is absorbed or transmitted depending on the arrangement of liquid crystal molecules.

Most common twisted nematic (TN) mode reflective LCD has the drawback of narrow viewing angle. Therefore, conventionally the hybrid mode reflective LCD capable of displaying full color and having a fast response time in the low voltage condition has been suggested. However, the hybrid mode reflective LCD only uses the birefringence effect of the liquid crystal molecules, accordingly the contrast ratio is degraded since the gray scale inversion is easily occurred depending on the viewing direction. To solve foregoing problem, a bi-axial compensating film is applied to the hybrid mode reflective LCD. However, the bi-axial compensating film is difficult to produce.

Therefore, conventionally the reflective LCD without using any optical compensating film has been suggested to solve the problem of gray scale inversion and to obtain wide viewing angle.

As shown in FIGS. 1A and 1B, the reflective LCD comprises a lower substrate 11, an upper substrate 12 opposite to the lower substrate 11, a pixel electrode 13 formed on the lower substrate 11 in the form of strip, a counter electrode 14 formed at the same plane with the pixel electrode 13 and spaced apart by a selected distance, a first homeotropic alignment layer 19 coated on the upper substrate 12, a second homeotropic alignment layer 20 to cover the lower substrate 11 where the pixel electrode 13 and the counter electrode 14, and a liquid crystal layer 15 sandwiched between the first and second homeotropic alignment layers 19,20. Herein, although not shown in the drawing, a color filter is provided at an inner surface of the upper substrate 12.

The reflective LCD further comprises a reflecting plate 16 disposed at an outer surface of the lower substrate 11, a polarizing plate 18 disposed at the backside of the upper substrate 11 and a quarter wave plate 17 disposed between the upper substrate 11 and the polarizing plate 18. Herein, liquid crystal molecules of positive dielectric anisotropy are used for the liquid crystal layer 15. The polarizing plate 18 is disposed such that its polarizing axis makes 45 degrees with the direction of an electric field, and the quarter wave plate 17 is disposed such that its axis makes 45 degrees with the polarizing axis of the polarizing plate 18. Herein, the pixel electrode 13 can be made of an opaque material such as Al or Cr.

Operation of the reflective LCD as constituted above is as follows.

When no voltage is applied to the device, as shown in FIGS. 1A and 2A, all the liquid crystal molecules 15a of the liquid crystal layer 15 are arranged such that their long axes are perpendicular to faces of the substrates 11,12 according to the homeotropic alignment layers 19,20. Then this, light of a selected direction among not-polarized light of the light source is linearly-polarized in the left or right via the polarizing plate 18 once the light passing the polarizing plate 18 passes the quarter wave plate 17, the light is left-circularly-polarized or right-circularly-polarized. Since all the liquid crystal molecules 15a in the liquid crystal layer 15 are arranged in the z direction, the light passed the quarter wave plate 17 directly passes through the liquid crystal layer 15 without causing any phase difference in the light. The light arrived at the reflecting plate 16 changes its transmitting direction into the −z direction. Accordingly, before the left (or right)-circularly-polarized light is reflected, the light is right (or left)-circularly-polarized. The right (or left)-circularly-polarized light directly passes the liquid crystal display 15 and the light is radiated into the quarter wave plate 17 again. The light passed through the quarter wave plate 17 is left (or right)-linearly-polarized. However, since an axis of the light passed through the polarizing plate 18 is perpendicular to an axis of the light radiated to the polarizing plate 18, the light radiated from the quarter wave plate 17 to the polarizing plate 18 does not pass the polarizing plate 18. Accordingly, the screen shows dark state.

On the other hand, when voltage is applied to the device as shown in FIGS. 1B and 2B, the liquid crystal molecules 15a directly in contact with the substrates hold their arrangement same as when no voltage is applied to the device according to an influence of the homeotropic alignment layers 19,20. In the respective central regions of the pixel electrode 13 and the counter electrode 14 similar to the case when no voltage is applied thereto, long axes of the liquid crystal molecules 15a are arranged perpendicular to faces of the upper substrate 12 and the lower substrate 11. Since there is formed a horizontal electric field $E_1$ and an elliptic electric field $E_2$ between the pixel electrode 13 and the counter electrode 14, the liquid crystal molecules are arranged according to electric fields $E_1, E_2$. Accordingly, there are formed two domains forming a symmetry in their left side and right side with respect to the center line of the pixel electrode 13 and the counter electrode 14 except the region in contact with the substrates 11,12.

With regard to the light transmitting process, light of a selected direction among not-polarized light of the light source is linearly-polarized by passing through the polarizing plate 18. Once the light passes the quarter wave plate 17, the linearly-polarized light is changed to be left (or right)-circularly-polarized. According to the angle between the optical axes of the liquid crystal molecules and a transmitting axis of the quarter wave plate 17, the light changes its polarizing state while passing the liquid crystal layer 15. That is to say, the left-circularly-polarized light is left-linearly-polarized while passing the liquid crystal layer 15 and the light is left (or right)-linearly-polarized again. The light reflected from the reflecting plate 16 is right (or left)-linearly-polarized. The right (or left)-circularly-polarized light is left (or right)-circularly-polarized while passing again the liquid crystal layer 15. Afterward, the left (or right)-circularly-polarized light is radiated into the quarter wave plate 17. The light passed through the quarter wave plate 17 is right (or left)-linearly-polarized. Consequently, the axis of the polarizing plate 18 is coincided with the optical axis passed through the quarter wave plate 17. Accordingly, the screen shows white state.

To form an in-plane electric field $E_1$ and an elliptic electric field $E_2$ as described above, the distance 1 between the electrodes 13,14 should be set relatively larger than the cell gap d, and widths of the respective electrodes 13,14 should be set relative wider, for example in the range of 10~20 µm to obtain a selected degree of intensity of electric field. However, when the device has a constitution as described above, although an electric field almost parallel to the substrate is formed between the electrodes 13,14, there are occurred equipotential lines in the upper portions of the electrodes 13,14 since most of the upper portions of the electrodes 13,14 are not affected by the electric field. As a result, the transmittance is degraded-greatly.

SUMMARY OF THE INVENTION

Accordingly, it is the object of the present invention to provide a reflective LCD capable of improving the transmittance and aperture ratio by transmitting light into the upper portions of the electrodes.

To accomplish the foregoing object, the present invention provides a reflective LCD comprising:

a lower substrate and an upper substrate opposed with a selected distance;

a liquid crystal layer sandwiched between the lower and upper substrates and comprising a plurality of liquid crystal molecules;

a gate bus line and a data bus line formed on the lower substrate to define a pixel;

a counter electrode and a pixel electrode formed at an inner-surface of the lower substrate, wherein both electrodes are formed with a selected distance and width so that most of the liquid crystal molecules in upper portions of those electrodes are sufficiently driven by forming a fringe field between said counter and pixel electrodes;

a thin film transistor provided adjacent to an intersection of the gate bus line and the data bus line and transmitting a signal of the data bus line into the pixel electrode when the gate bus line is selected;

a polarizing plate disposed at an outer surface of the upper substrate;

a reflecting plate disposed at an outer surface of the lower substrate; and a quarter wave plate sandwiched between the quarter wave plate and the lower substrate, or between the polarizing plate an the upper substrate, wherein both counter and pixel electrodes are made of a transparent conductor, wherein a distance between the upper and lower substrates is greater in length than a distance between the counter and pixel electrodes.

The present invention further provides a reflective LCD comprising:

a lower substrate and an upper substrate opposed with a first distance;

a liquid crystal layer sandwiched between the lower and upper substrates and comprising a plurality of liquid crystal molecules;

a gate bus line and a data bus line formed on the lower substrate to define a pixel;

a counter electrode formed at each pixel of the lower substrate, transmitted with the common signal and having a plurality of branches diverged in parallel with the data bus line and at least a bar for connecting the branches, wherein the respective branches have a first width and they are spaced with a second distance;

a pixel electrode having a plurality of strips formed between the respective branches of the counter electrode, having a second width, and spaced apart by a third distance, and at least a bar for connecting the strips;

a thin film transistor provided adjacent to an intersection of the gate bus line and the data bus line and transmitting a signal of the data bus line into the pixel electrode when the gate bus line is selected;

a polarizing plate disposed at an outer surface of the upper substrate;

a reflecting plate disposed at an outer surface of the lower substrate; and a quarter wave plate sandwiched between the quarter wave plate and the lower substrate, or between the polarizing plate an the upper substrate, wherein both counter and pixel electrodes are made of a transparent conductor, wherein the first distance is greater in length than a distance between the branch of the counter electrode and the strip of the pixel electrode, wherein the first and second widths are set such that the liquid crystal molecules in upper portions of the branch of the counter electrode and the strip of the pixel electrode are all aligned by the electric field between adjacent branches and strips.

Moreover, the present invention provides a reflective LCD comprising:

a lower substrate and an upper substrate opposed with a selected distance;

a liquid crystal layer sandwiched between the lower and upper substrates and comprising a plurality of liquid crystal molecules;

a gate bus line and a data bus line formed on the lower substrate to define a pixel;

a counter electrode formed at each pixel of the lower substrate, transmitted with a common signal and shaped of a plate;

a pixel electrode formed over the counter electrode and having a plurality of strips, wherein the strip has a selected width and spaced from each other by a selected distance;

a thin film transistor provided adjacent to an intersection of the gate bus line and the data bus line and transmitting a signal of the data bus line into the pixel electrode when the gate bus line is selected;

a polarizing plate disposed at an outer surface of the upper substrate;

a reflecting plate disposed at an outer surface of the lower substrate; and a quarter wave plate sandwiched between the quarter wave plate and the lower substrate, or between the polarizing plate an the upper substrate, wherein both counter and pixel electrodes are made of a transparent conductor, wherein a distance between the upper and lower substrates is greater in length than a distance between the counter electrode and the pixel electrode, wherein a width of the strip of the pixel electrode and a width of the counter electrode disposed between the strips are set such that the liquid crystal molecules in upper portions of the counter electrode disposed between the strips and the strip of the pixel electrode are all aligned by the electric field between adjacent branches and strips.

In the reflective LCD according to the present invention, it is possible to drive the liquid crystal molecules in upper portions of driving electrodes according to fringe fields being formed at both sides of the electrodes since both counter and pixel electrodes are made of a transparent material and a distance between the driving electrodes is smaller in length than the cell gap so as to form a plurality of fringe fields. Therefore, compared to the conventional IPS mode LCD, the transmittance of LCD device can be greatly improved.

BRIEF DESCRIPTION OF THE DRAWINGS

FIG. 6 is a cross-sectional view showing the reflective LCD according to the present invention.

FIGS. 7A to 7E illustrate light transmitting process in the LCD according to the present invention when the electric field is on.

DETAILED DESCRIPTION OF THE PREFERRED EMBODIMENTS

Hereinafter, detailed description of the preferred embodiments will be discussed with reference to the attached drawings.

Figure 1A:
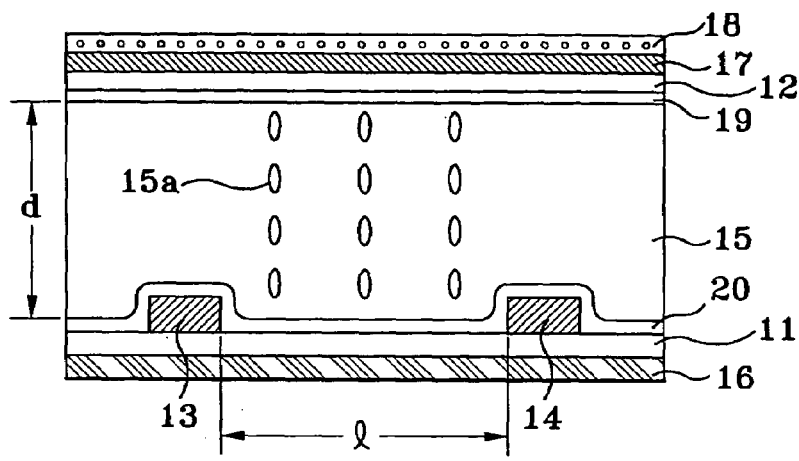
FIGS. 1A and 1B are cross-sectional views showing a conventional reflective LCD.
Figure 1B:
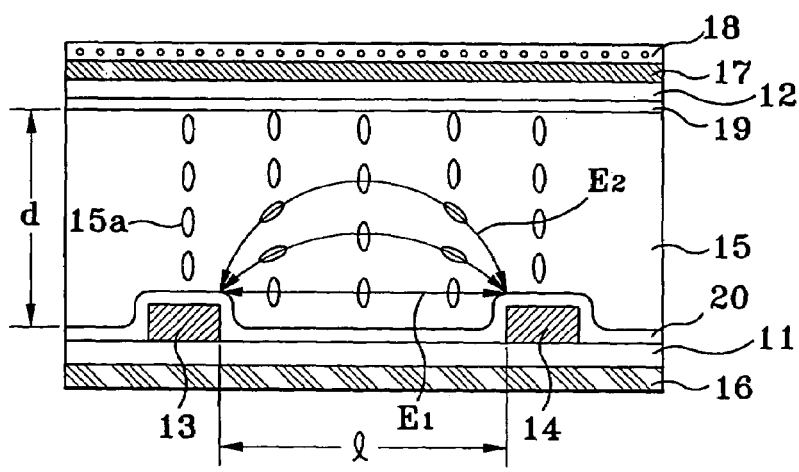
Figure 2A:
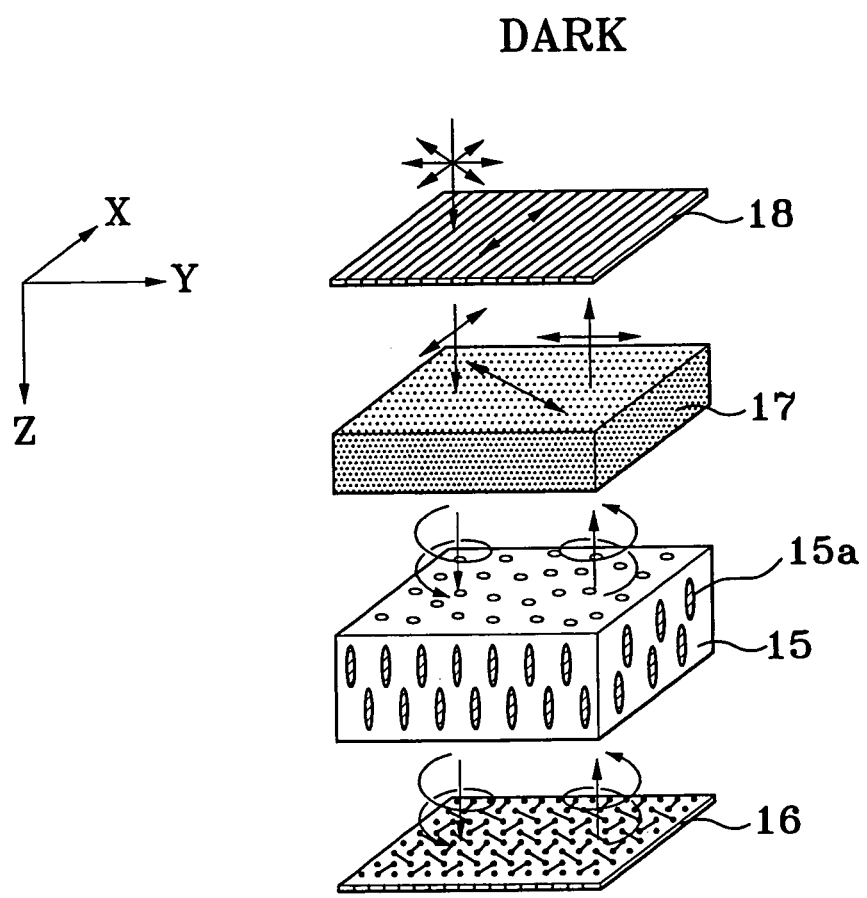
FIGS. 2A and 2B illustrate light transmitting process in the conventional reflective LCD.
Figure 2B:
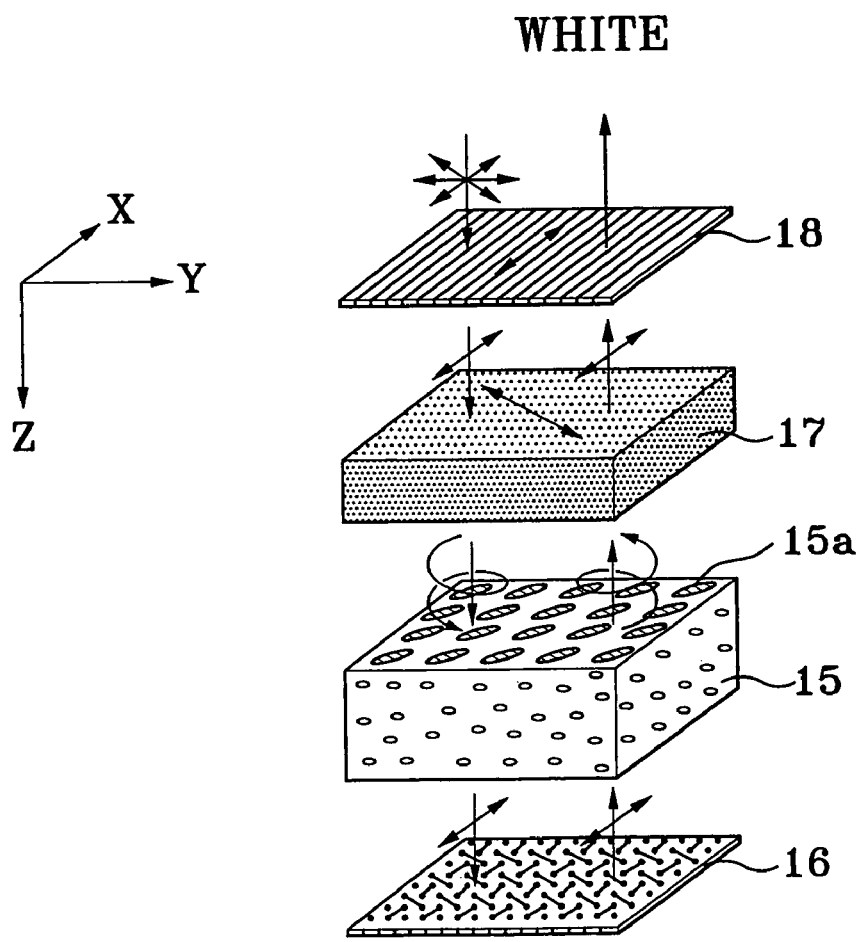
Figure 3:
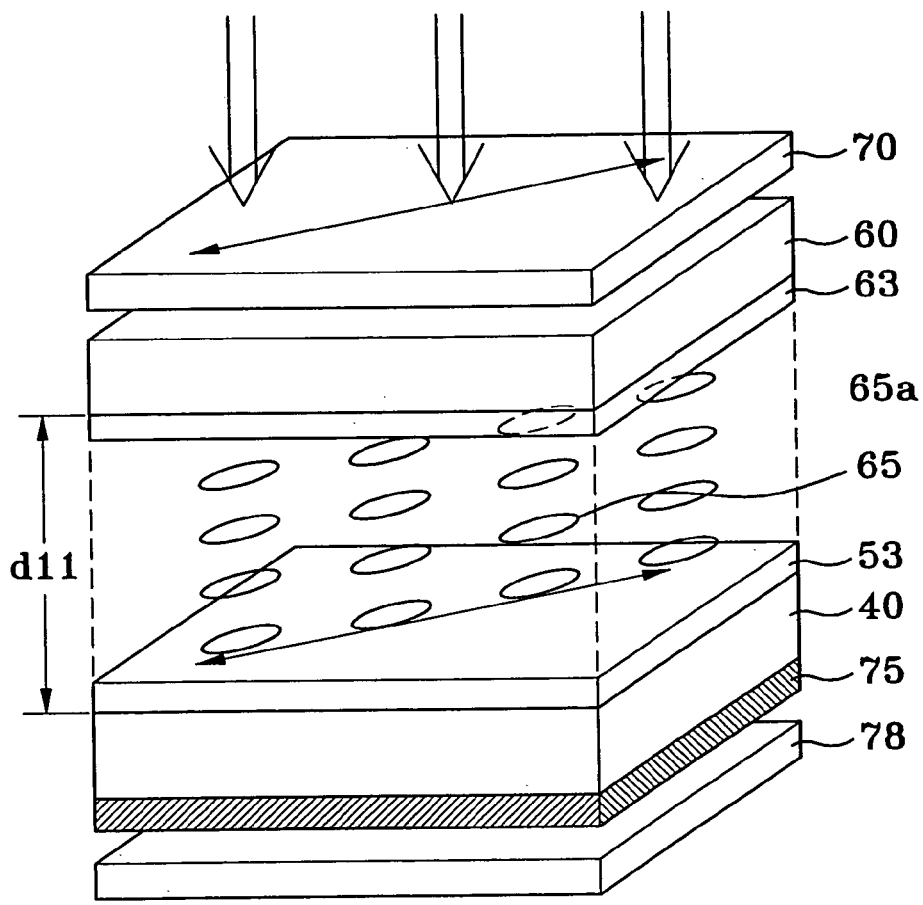
FIG. 3 is a perspective view showing a reflective LCD according to the present invention.
Figure 4:
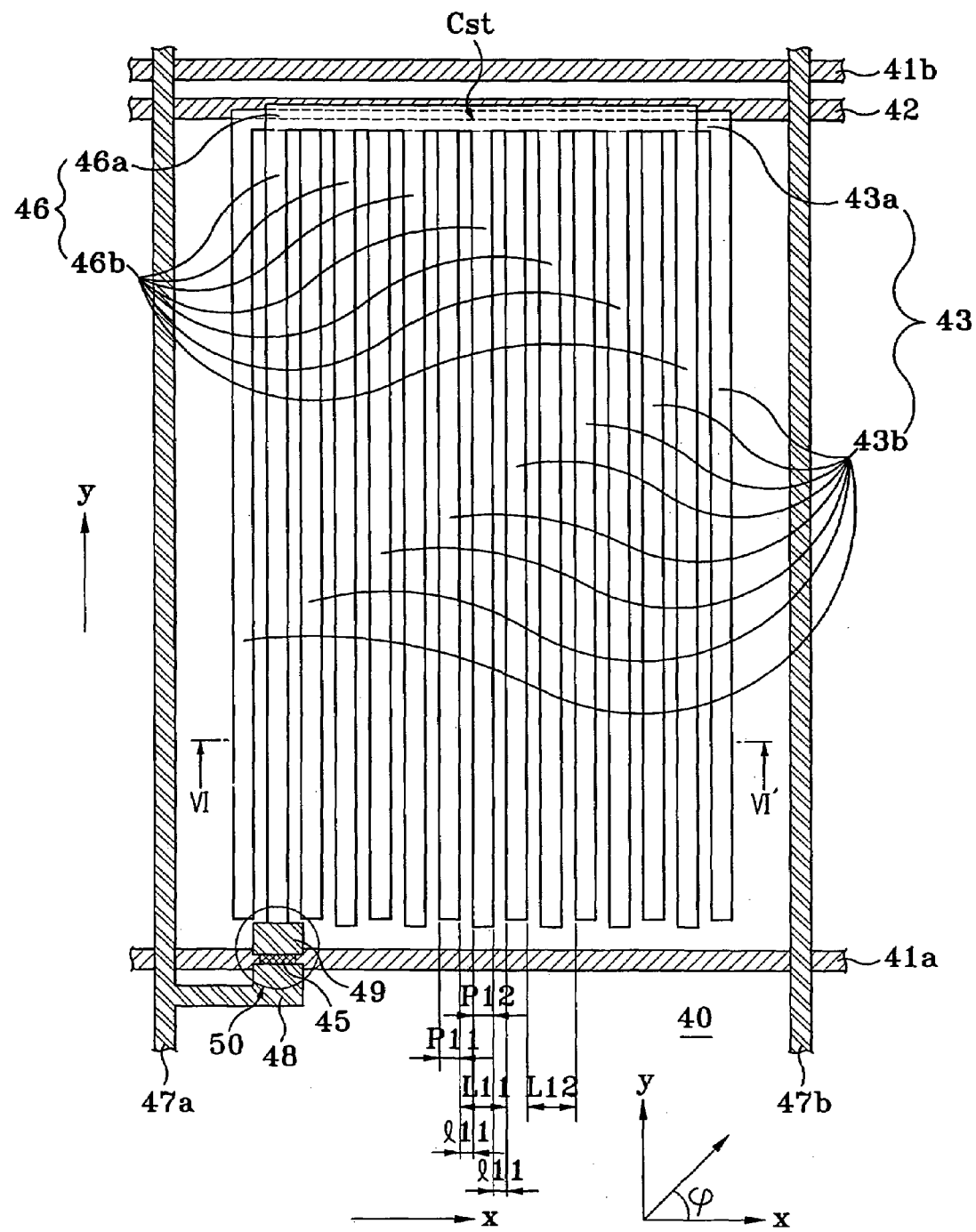
FIG. 4 is a plan view showing an LCD according to an embodiment of the present invention.

Referring to FIGS. 3 and 4, a lower substrate 40 is opposed to an upper substrate 60 with a selected distance d11. A liquid crystal layer 65 is sandwiched between the lower substrate 40 and the upper substrate 60. Liquid crystal molecules 65a in the liquid crystal layer 65 is nematic molecules. Further, the liquid crystal layer 65 is preferably formed such that the product of the index of refractive anisotropy $\Delta n$ of the liquid crystal molecules 65a and the cell gap d11 is 0.2~1.5 μm. In the meantime, the dielectric anisotropy $\Delta \varepsilon$ is set according to an angle between a rubbing axis and the x-axis. A polarizing plate 70 for linearly-polarizing a natural light in a selected direction is attached at an outer surface of the upper substrate 60. A quarter wave plate 75 for shifting the phase of light passed the liquid crystal layer 65 by 90 degrees, is attached at an outer surface of the lower substrate 40. A reflecting plate 78 for reflecting the light passed the quarter wave plate 75 to the liquid crystal layer 65, is attached at an outer surface of the quarter wave plate 75. Herein, the quarter wave plate 75 can be disposed between the polarizing plate 70 and the upper substrate 60 as in the conventional LCD.

As shown in FIG. 4, on the lower substrate 40, a plurality of gate bus lines 41a,41b are disposed with a selected interval, arranged and extended in the x direction. Further, a plurality of data bus lines 47a,47b are disposed on the lower substrate 40 with a selected interval and extended in the y direction. As a result, the data bus lines together with the gate bus lines 41a,41b define matrix regions. In the drawings, only a pair of gate bus lines 41a,41b and a pair of data bus lines 47a,47b are shown. Herein, the matrix region comprises a pair of gate bus lines 41a,41b and a pair of data bus lines 47a,47b, and then the matrix region becomes a pixel of an LCD. Gate insulating layers (not shown) are sandwiched between the gate bus lines 41a,41b and the data bus lines 47a,47b thereby insulating therebetween. A common signal line 42 is extended in a selected direction, for example the x direction and is disposed between a pair of gate bus lines 41a,41b. For instance, preferably the common signal line 42 is disposed close to a previous gate bus line 41a rather than its corresponding gate bus line 41a. Herein, to reduce the RC delay time, the gate bus lines 47a,47b, the common signal line 42 and the data bus lines 47a,47b are made of a metal layer having a high conductivity selected from a group consisting of Al, Mo, Ti, W, Ta, Cr and composition thereof, or made of at least two alloy layers selected from the group. In the present embodiment, MoW alloy layer is used.

A counter electrode 43 is formed within each pixel region of the lower substrate 40. Herein, the counter electrode 43 is formed on the lower substrate 40 and is in contact with the common signal line 42. A selected portion of the counter electrode is connected to the common signal line 42 thereby receiving a common signal. Herein, the counter electrode 43 comprises a body 43a being disposed parallel to the gate bus lines 41a, 41b and in contact with the common signal line 42, and a plurality of branches 43b being extended from the body 43a in the y direction. Namely, the counter electrode 43 is formed in the shape of a comb. Herein, the respective branches 43b have a selected width P11 and are spaced each other with a selected distance L11. At this time, the width P11 and the distance L11 of the respective branches 43b are formed a bit narrower than those conventional ones while taking into consideration of width and distance of a pixel electrode to be formed in subsequent processes.

The pixel electrode 46 is also formed within each pixel region of the lower substrate 40. Herein, the pixel electrode 46 is formed on a gate insulating layer 44 so as to overlap the counter electrode 43. The pixel electrode 46 comprises a first part 46a being overlapped with the body 43a of the counter electrode 43, a plurality of second parts 46b being extended from the first part in the y direction with the form of strip. Herein, the second parts 46b have a selected width P12 and they are spaced with a selected distance L12. Further, the second parts 46b are disposed between the branches 43b of the counter electrode 43.

Herein, although not shown in the drawing, ends of the branches 43b of the counter electrode 43 can be bound with a bar (not shown) being disposed parallel to the gate bus line 41a and ends of the second parts 46b of the pixel electrode 46 can be bound with the bar (not shown)-being disposed parallel to the gate bus line 41a. Otherwise, only the ends of the branches 43b of the counter electrode 43 can be bound, or only the ends of the second parts 46b of the pixel electrode 46 can be bound selectively.

In the present embodiment, the width P12 of the second parts 46b of the pixel electrode 46 is formed narrower than the distance L11 between the branches 43b of the counter electrode 43. Accordingly, the second parts 46b of the pixel electrode 46 are spaced from the branches 43b of the counter electrode 43 by a selected distance l 11. At this time, the distance l 11 between the second parts 46b of the pixel electrode 46 and the branches 43b of the counter electrode 43, is formed narrower than the cell gap d11 between two substrates 40,60 and the distance l 11 is set in the range of 0.1 μm~5 μm when the pixel size is 110 μm×330 μm. The widths of the branches 43b of the counter electrode 43 and the second parts 46b of the pixel electrode 46 are formed such that fringe fields formed therebetween can affect upper portions thereof. For instance, when the size of pixel is 110 μm×330 μm and eight branches 43b of the counter electrode 43 and seven second parts 46b of the pixel electrode 46 are formed therein, the widths of the branches 43b and the second parts 46b are set in the range of 1~8 μm, more preferably in the range of 2~5 μm. Furthermore, the ratio of the width P12 of the second parts 46b to the width P11 of the branches 43b is in the range of 0.2~4.

Herein, width and distance of the branches 43b of the counter electrode 43 and the second parts 46b of the pixel electrode are adjustable according to the size of pixel and number of the same. However, the widths of those electrodes 43b,46b should be formed such that the liquid crystal molecules in the upper portions of the electrodes are sufficiently driven by the fringe field formed between the electrodes 43b,46b. Herein, The counter electrode 43 and the pixel electrode 46 are made of transparent materials.

A thin film transistor 50 as a means for switching is formed adjacent to the respective intersections of the gate bus lines 41a and the data bus lines 47a. The thin film transistor 50 comprises a channel layer 45 formed on the gate bus line 41a; a drain electrode 48 overlapped with one side of the channel layer 45 and extended from the data bus line 47a; and a source electrode 49 overlapped with the other side of the channel layer 45 and in contact with a selected portion of the pixel electrode 46.

A storage capacitor Cst is occurred at a region that the counter electrode 43 and the pixel electrode 46 are overlapped. The storage capacitor Cst acts for maintaining data signal for one frame. In the present embodiment, the storage capacitor Cst is occurred at the region that the body 43a of the counter electrode 43 and the first part 46a of the pixel electrode 46 are overlapped.

A color filter (not shown) is arranged at the inner surface of the upper substrate 60.

A first alignment layer 53 is formed on the resultant of the lower substrate 40 and a second alignment layer 63 is formed at an inner surface of the color filter of the upper substrate 60. The respective alignment layers 53,63 have surfaces for arranging the liquid crystal molecules (not shown) in a selected direction. Further, the first and second alignment layers 53,63 are treated so that the liquid crystal molecules have a pretilt angle of 0~10°. The first alignment layer 53 in the lower substrate 40 is rubbed to make an angle φ with the x direction, and the second alignment layer 63 in the upper substrate 52 is rubbed to be anti-parallel to the rubbing direction of the first alignment layer 53, i.e. to make approximately 180°. At this time, when the x-axis that becomes the electric field forming direction later, and the rubbing direction of the first alignment layer 53 or the second alignment layer 63 make exactly 45°, both liquid crystal molecules of positive and negative dielectric anisotropy can be used. When the x-axis that becomes the electric field forming direction later, and the rubbing axis of the first alignment layer 53 (or the second alignment layer 63) make over 45°, the liquid crystal molecules of positive dielectric anisotropy can be used. Otherwise they make below 45°, then the liquid crystal molecules of negative dielectric anisotropy can-be used. Herein, the reason different types of molecules are used according to the angle between the rubbing axis of the alignment layer and the x-axis, is that the maximum transmittance of the LCD can be obtained by doing so. A polarizing plate 70 is disposed such that it polarizing axis P is parallel to the rubbing axes of the first alignment layer 53 and the second alignment layer 63.

Operation of the reflective LCD as constituted above will be discussed hereinafter.

First, when the gate bus lines 41a is not selected, no signal is transmitted to the pixel electrode 46b from the data bus line 47a, there is formed no electric field between the counter electrode 43 and the second part 46b of the pixel electrode 46.

Figure 5A:
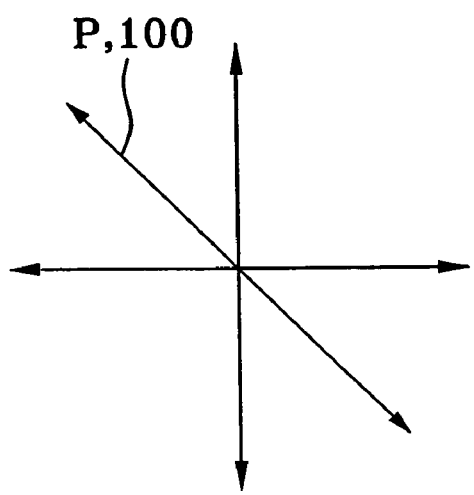
FIGS. 5A to 5D illustrate light transmitting process in the LCD according to the present invention when the electric field is off.

Then this, the natural light is linearly-polarized according to the polarizing plate 70. As shown in FIG. 5A, the linearly-polarized-light is coincided with the polarizing axis P of the polarizing plate 70. At this time, FIG. 5A shows a polarizing state of the light, assuming that the light 100 passed through the polarizing plate 70 having the same component in their horizontal and vertical phases and the transmitting direction of the polarized light is the z-axis and the phase of the x component of the transmitted light is faster than that of the y component. The light, 100 does not change its polarizing state while passing the liquid crystal layer 65.

Figure 5B:
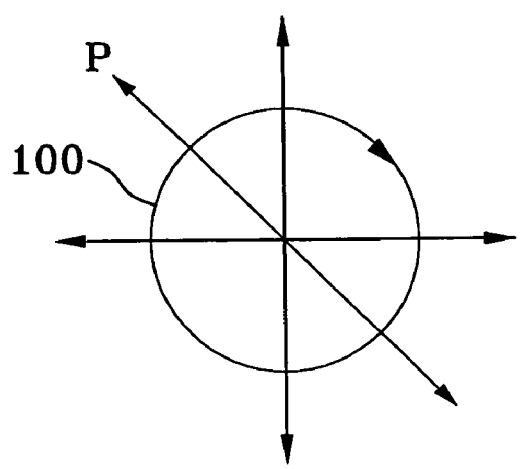

The linearly-polarized light that is passed through the liquid crystal layer 65, changes its polarizing state while passing the quarter wave plate 75. That is to say, the quarter wave plate 75 occurs a phase difference of approximately 90° i.e. a quarter of one period, for example 360° at a normal path and an abnormal path. As a result, referring to FIG. 5B, the linearly-polarized light changes right-circularly-polarized while passing the quarter wave plate 75.

Figure 5C:
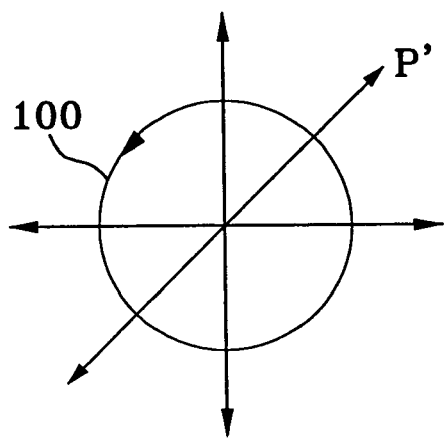

The right-circularly polarized light that is passed through the quarter wave plat e 75, occurs phase difference of 180° according to the reflecting plate 78 thereby left-circularly-polarizing the light reflected by the reflecting plate 78 as shown in FIG. 5c. At this time, by passing the reflecting plate 78, the light transmitting direction is the −z-axis. Accordingly, the polarizing axis of the polarizing plate 75 can be looked as P'.

Figure 5D:
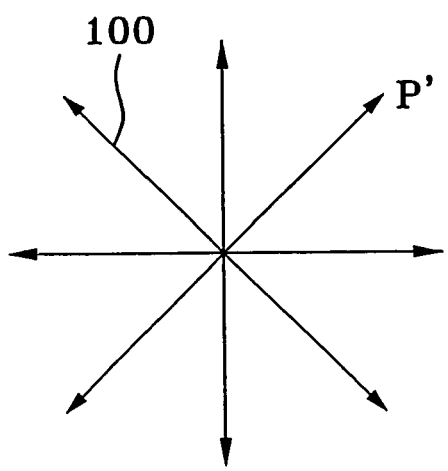

As the light passed the reflecting plate 78 is passed again the quarter wave plate 28, the right-linearly-polarized light is left-circularly-polarized as shown in FIG. 5D.

Then, the left-linearly-polarized light 100 that is passed through the quarter wave plate 75 does not change its polarizing state while passing the liquid crystal layer 65, and the light passed through the liquid crystal layer 65 arrives at the polarizing plate 70. At this time, the polarizing axis p' of the polarizing plate 70 is perpendicular to the left-linearly-polarized light 100 (in FIG. 5D). Accordingly, the light 100 does not pass the polarizing plate 70. The screen shows dark state.

On the other hand, when a scanning signal is transmitted to the gate bus line 41a and a display signal is transmitted to the data bus line 47a, the thin film transistor 50 formed adjacent to the intersection of the gate bus line 41a and the data bus line 47a is turned on thereby transmitting the signals to the pixel electrode 46. At this time, a common signal having a different voltage from the display signal is continuously applied to the counter electrode 43, and there is formed an electric field Ef between the counter electrode 43 and the pixel electrode 46. Herein, the electric field Ef is substantially formed between the branch 43b of the counter electrode 43 and the second part 46b of the pixel electrode 46.

At this time, the distance l 11 between the branch 43b of the counter electrode 43 and the second part 46b of the pixel electrode 46 is a bit narrower than the distance between electrodes of the conventional IPS-LCD, therefore as shown in FIG. 6, the electric field is formed as a parabolic fringe field Ef having a larger curvature compared to the electric field of the conventional IPS-LCD. Further, since the widths of the branch 43b of the counter electrode 43 and the second part 46b of the pixel electrode 46 are sufficiently narrow such that the liquid crystal molecules in the upper portions of the electrodes 43,46 are driven by the fringe field Ef. Accordingly, the aperture ratio and transmittance are improved. Furthermore, when the fringe field Ef is projected to the lower substrate 40, the fringe field Ef and rubbing axes of the alignment layers 63,53 make approximately ±45°. As a result, for example, when liquid crystal molecules 65*a* of positive dielectric anisotropy is used, long axes of the liquid crystal molecules is parallel with the electric field, and then the long axes of the liquid crystal molecules 65 and the; polarizing axis or the rubbing axis make 45° respectively. This satisfies the maximum transmittance condition.

At this time, the light incident to the LCD device of the present embodiment has a transmitting process as follows.

Figure 7A:
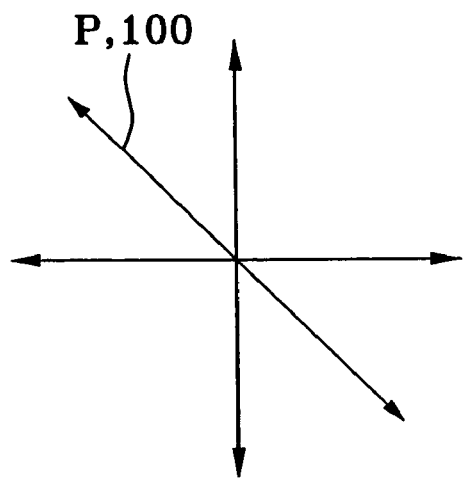

First of all, it is on the assumption that the natural light is left-linearly-polarized in the same direction that the polarizing axis of the polarizing plate 70, when the light passes the polarizing plate 70 as shown in FIG. 7A. At this time, the light transmitting direction is the direction of z-axis.

Figure 7B:
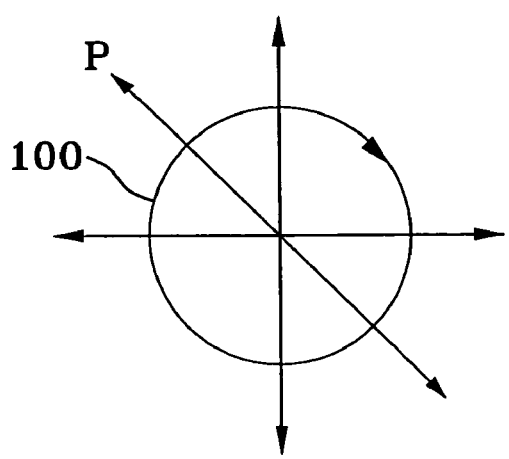

Afterward, as shown in FIG. 7B, the light passed through the polarizing plate 70 changes its polarizing state into the right-circularly-polarized state while passing the liquid crystal layer 65. In other words, the liquid crystal molecules are rearranged according to the electric field Ef, therefore the liquid crystal layer 65 has a phase deference of 90 degrees.

Figure 7C:
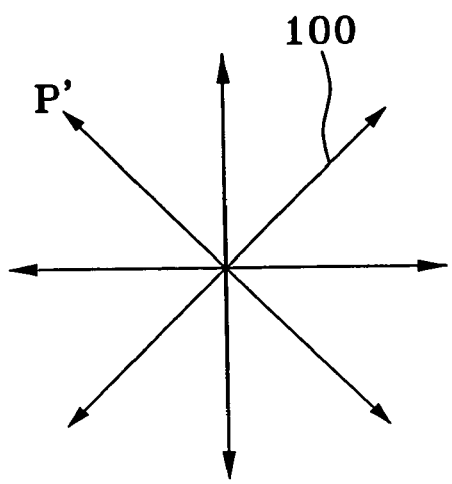
Figure 7D:
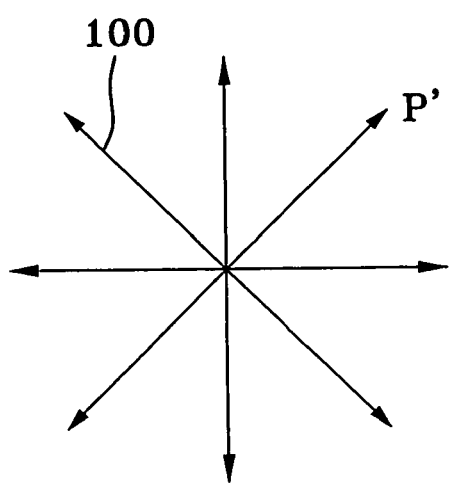

And then, the light 100 passed through the liquid crystal layer 65 is right-linearly-polarized while passing the quarter wave plate 75 having the phase difference of 90 degrees as shown in FIG. 7C.

The light 100 passed through the quarter wave plate 75 occurs a phase shift by 180 degrees while passing the reflecting layer 78. Accordingly, the light 100 is left-linearly-polarized while passing the reflecting plate 78. At this time, the light transmitting direction becomes the −z-axis while passing the reflecting plate 78. Therefore, the direction of polarizing plate P' can be looked.

Figure 7E:
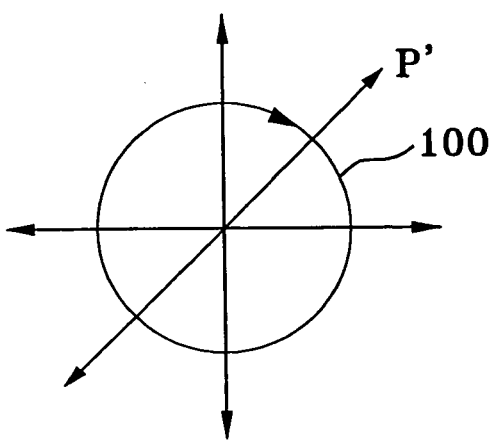
Figure 7F:
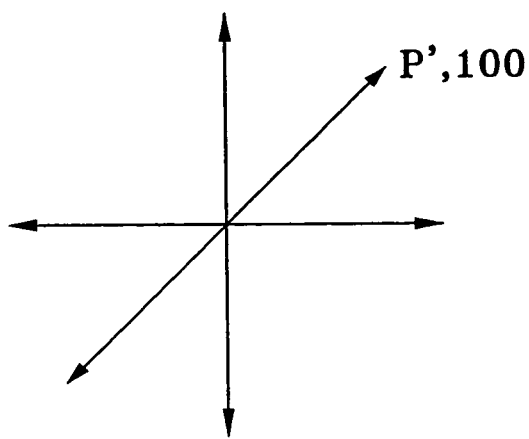

Next, as shown in FIG. 7E, the light 100 passed through the reflecting plate 78 is right-circularly-polarized while passing the quarter wave plate 75, and then, the right-circularly-polarized light is right-linearly-polarized while passing the liquid crystal layer 65. As a result, the right-circularly-polarized light 100 passed through the liquid crystal layer 65 is coincided with the direction of polarizing plate P' thereby passing the upper polarizing plate 70. The screen shows white state.

Furthermore, a relatively low threshold voltage compared to the conventional one can be obtained by shortening the distance l 11 between the electrodes. Generally the threshold voltage of IPS mode LCD can be expressed as follows.

$$Vth = \pi l/d(K2/\epsilon_0 \Delta \epsilon)^{1/2} \qquad \text{equation 1}$$

wherein, Vth is a threshold voltage, l is the distance between the electrodes, d is a cell gap, K2 is a modulus of twist elasticity, $\epsilon_0$ is a dielectric constant, and $\Delta \epsilon$ is an index of dielectric anisotropy.

As shown in the equation 1, according to the present embodiment, the value of l/d is relatively reduced and the threshold voltage is still more lowered. Accordingly, the present embodiment enables the operation in the low voltage condition.

The response time of LCD according to the present embodiment can be greatly improved compared to the conventional LCDs for the following reasons. First, the linear distance of the electric field being formed between the electrodes 43*b*,46*b* is formed greatly shorter than that of the conventional IPS-LCD, thereby intensifying the strength of electric field. Secondly, there is formed a parabolic fringe field having larger curvature and radius compared to the conventional one due to the short distance between the electrodes thereby effectively driving the liquid crystal molecules in the upper substrate.

EMBODIMENT 2

Figure 8:
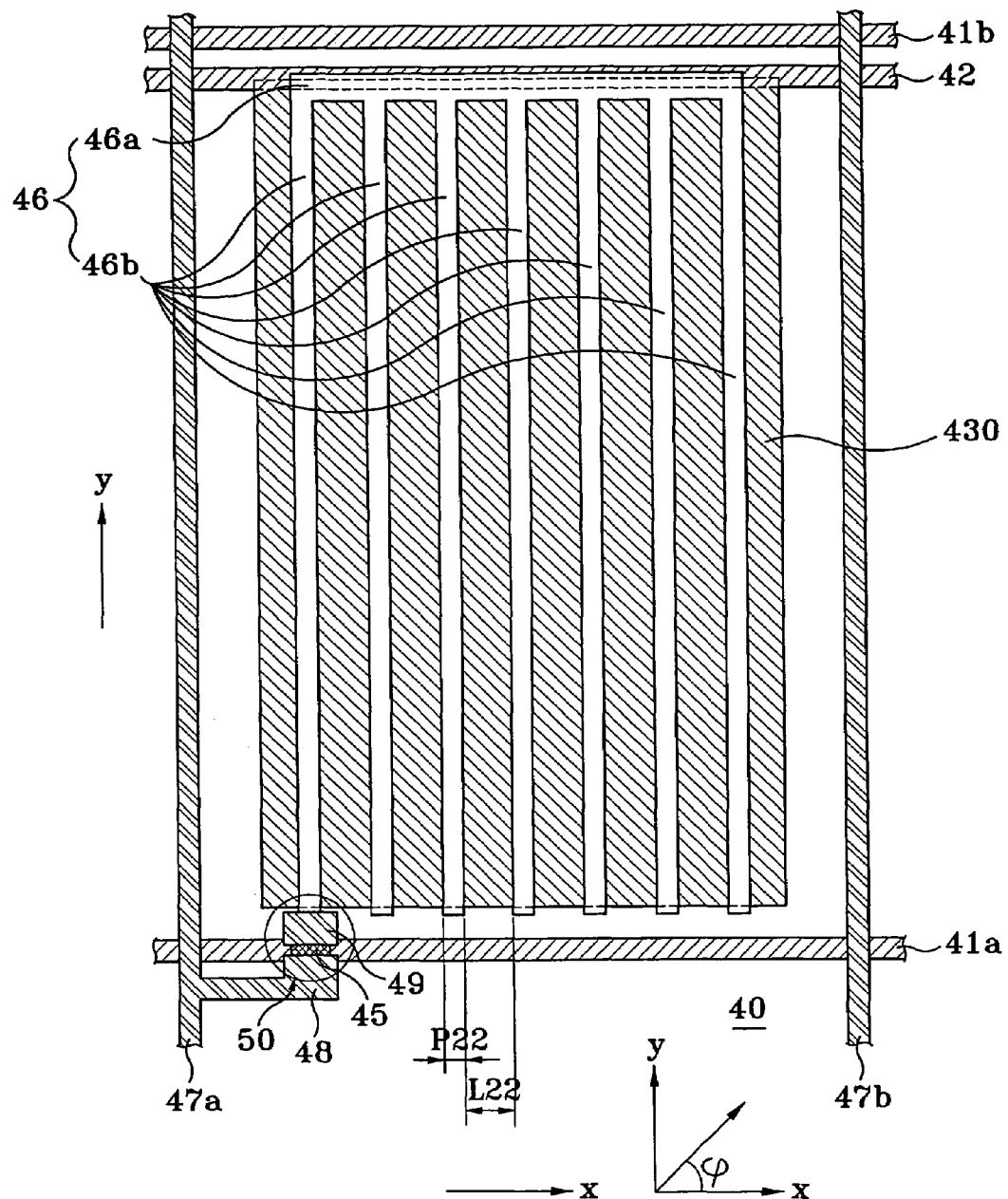
FIG. 8 is a plan view showing another embodiment of the present invention.

FIG. 8 is a plan view showing another embodiment of the present invention. Similar constitution as in the first embodiment is applied to the present embodiment 2 except the shape of a counter electrode. Accordingly, description of the counter electrode will be discussed hereinafter.

Namely, the counter electrode 430 according to the present embodiment, is formed within each pixel region of the lower substrate 40. Herein, the counter electrode 430 is formed at the same plane with the gate bus lines 41*a*,41*b* and is in contact with the common signal line 42. The counter electrode 430 is made of a transparent metal, such as ITO and shaped of a plate, more preferably rectangular plate. Herein, the counter electrode 430 is spaced from the gate bus lines 41*a*,41*b* and the data bus lines 47*a*,47*b* respectively.

The pixel electrode 460 is also formed within each unit pixel region of the lower substrate 40. At this time, the pixel electrode 460 is formed on the gate insulating layer (not shown) so that the pixel electrode 460 is overlapped with the counter electrode 430. Herein, the pixel electrode 460 is made of a transparent conductive material, for example the ITO metal similar to the counter electrode 430. The pixel electrode 460 also comprises a first part 460*a* being disposed parallel to the gate bus lines 41*a*,41*b*, i.e. in the x direction, and a plurality of second parts 460*b*, for example seven second parts 460*b* being extended from the first part 460*a* in the y direction in the form of strip. At this time, the first part 460*a* and the second parts 460*b* of the pixel electrode 460 are all overlapped with the counter electrode 430. Therefore, the storage capacitance is more increased than the first embodiment.

The respective second parts 460*b* have a selected width P22 and are spaced apart by a selected distance L22. Further, since the counter electrode 430 is in the form of a plate, the counter electrode 430 is exposed through a distance between the respective second parts 460*b* of the pixel electrode 460.

At this time, ends of the second parts 460*b* of the pixel electrode 460 are bounded with a third part having a bar shape.

In a plan view, there seems to be no gap between the second part 460*b* of the pixel electrode 460 and the counter electrode 430. However, in a sectional view, there exists a distance as much as the thickness of the gate insulating layer (not shown).

When the size of pixel is 110×330 μm, the distance L22 between the second parts 460*b* of the pixel electrode 460 and the counter electrode 430 is in the range of approximately 0.2~5. At this time, the distance L22 can be adjusted according to the size of pixel and the number of second parts 460*b*. Further, under the same pixel size condition, the ratio of widths P22 of the second parts 460*b* of the pixel electrode 460 to the distance L22 between the second parts 460*b* of the pixel electrode 460 is set in the range of 0.2~5, and the ratio of the distance L22 between second parts 460*b* of the pixel electrode 460 to the cell gap d11 is set in the range of 0.1~5.

As described in detail, according to the present invention, following effects can be obtained.

First, in the reflective LCD, both counter and pixel electrodes are made of transparent materials, the distance between the electrodes are narrower than the cell gap so that a plurality of fringe fields may be formed, and the widths of the driving electrodes are formed narrow enough to drive the liquid crystal molecules formed in both sides of the electrodes sufficiently thereby sufficiently driving all liquid crystal molecules in the upper portions of the electrodes. Accordingly, the transmittance of the reflective LCD is greatly improved.

Secondly, an enhanced aperture ratio is obtained since both counter and pixel electrodes are made of a transparent material.

Thirdly, the response time is greatly improved since there is formed a fringe field of large curvature that drives the liquid crystal molecules in the upper substrate due to narrow distance of the counter and pixel electrodes, and the strength of electric field is intensified due to short distance of electrodes.

Fourthly, since the distance of electrodes are shorter than the cell gap, a lower threshold voltage compared to the conventional IPS mode LCD is obtained. Accordingly, the present invention enables the operation in the low voltage condition.

Fifthly, the viewing angle of relatively wider than the conventional TN mode LCD can be obtained.

Sixthly, the size of LCD and manufacturing thereof can be reduced since no extra light source is required.

Various other modifications will be apparent to and can be readily made by those skilled in the art without departing from the scope and spirit of the present invention.

What is claimed is:

1. A reflective liquid crystal display (LCD) of high aperture ration, high transmittance and wide viewing angle comprising:
   a lower substrate;
   an upper substrate opposed to the lower substrate and being separated therefrom by a selected first distance;
   a liquid crystal layer sandwiched between the lower and upper substrates comprising a plurality of liquid crystal molecules;
   a gate bus line and a data bus line formed on the lower substrate to define a pixel;
   a counter electrode having a first width and a pixel electrode having a second width formed at an inner surface of the lower substrate, wherein the counter and pixel electrodes are horizontally separated by a selected second distance to generate fringe field between the counter and pixel electrodes,
   wherein the second distance is less than either the first width or the second width;
   wherein the most of the liquid crystal molecules in upper portions of those electrodes are sufficiently driven in both the horizontal and vertical directions by the fringe field between said counter and pixel electrodes;
   a thin film transistor provided adjacent to an intersection of the gate bus line and the data bus line and transmitting a signal of the data bus line into the pixel electrode when the gate bus line is selected;
   a polarizing plate disposed at an outer surface of the upper substrate;
   a reflecting plate disposed at an outer surface of the lower substrate; and
   a quarter wave plate sandwiched between the reflecting plate and the lower substrate,
   wherein both counter and pixel electrodes are made of a transparent conductor, and
   wherein the selected first distance between the upper and lower substrates is greater in length than the selected second distance between the counter and pixel electrodes.

2. The reflective LCD of claim 1, wherein the transparent conductor is ITO (indium tin oxide).

3. The reflective LCD of claim 1, further comprising a first alignment layer coated on an opposing face of the lower substrate and having a surface for aligning the liquid crystal molecules in a selected direction in the absence of an electric field and having a first rubbing axis which makes a selected angle with the electric field, and a second alignment layer coated on an opposing face of the upper substrate and having a surface for aligning the liquid crystal molecules in a selected direction in the absence of an electric field and having a second rubbing axis which makes a selected angle with the first rubbing axis.

4. The reflective LCD of claim 3, wherein the first and second alignment layers are given with a pretilt angle of 0~10 degrees.

5. The reflective LCD of claim 4, wherein those rubbing axes of the first and second alignment layers are disposed anti-parallel each other.

6. The reflective LCD of claim 5, wherein the polarizing axis of the polarizing plate coincides with the second rubbing axis.

7. The reflective LCD of claim 6, wherein liquid crystal molecules having negative dielectric anisotropy are used when the angle between the second rubbing axis and the electric field is 0~45 degrees, and the liquid crystal molecules having positive dielectric anisotropy are used when the angle between the second rubbing axis and the electrical field is 45~90 degrees.

8. The reflective LCD of claim 1, wherein the product of refractive anisotropy of the liquid crystal molecules and the distance between the upper and lower substrates is 0.2~0.6 µm.

9. The reflective LCD of claim 1, wherein the product of refractive anisotropy of the liquid crystal molecules and the first distance is 0.2~0.6 µm.

10. The reflective LCD of claim 1, wherein the counter and pixel electrodes are vertically separated by a predetermined distance.

11. A reflective liquid crystal display (LCD) having high aperture ratio, high transmittance and a wide viewing angle comprising:
    a lower substrate;
    an upper substrate opposed to the lower substrate and being separated therefrom by a selected first distance;
    a liquid crystal layer sandwiched between the lower and upper substrates comprising a plurality of liquid crystal molecules;
    a gate bus line and a data bus line formed on the lower substrate to define a pixel;
    a counter electrode formed at each pixel of the lower substrate, transmitted with the common signal and having a plurality of branches diverged in parallel with the data bus line and at least a bar for connecting the branches,
    wherein the respective branches have a first width and are horizontally spaced and separated by a second distance;
    a pixel electrode having a plurality of strips formed between the respective branches of the counter electrode, each Strip having a second width and horizontally spaced apart from an adjacent strip by a third distance, and at least a bar for connecting the strips,
    wherein the horizontal distance between two adjacent counter and pixel electrodes is less than either the first width or the second width;

wherein the second width is smaller in length than the second distance, and the first width is smaller in length than the third distance;

a thin film transistor provided adjacent to an intersection of the gate bus line and the data bus line and transmitting a signal of the data bus line into the pixel electrode when the gate bus line is selected;

a polarizing plate disposed at an outer surface of the upper substrate;

a reflecting plate disposed at an outer surface of the lower substrate; and a quarter wave plate sandwiched between the reflecting plate and the lower substrate, wherein both counter and pixel electrodes are made of a transparent conductor, wherein the first distance between the upper and lower substrates is greater than the second distance between the branch of the counter electrode and the strip of the pixel electrode, and wherein the pixel and counter electrodes are capable of generating fringe field of electric field components running in horizontal and vertical directions in the liquid crystal layer to drive the liquid crystal molecules.

12. The reflective LCD of claim 11, wherein the transparent conductor is ITO (indium tin oxide).

13. The reflective LCD of claim 11, further comprising a first alignment layer coated on an opposing face of the lower substrate and having a surface for aligning the liquid crystal molecules in a selected direction in the absence of an electric field having a first rubbing axis which makes a selected angle with the electric field, and a second alignment layer coated on an opposing face of the upper substrate and having a surface for aligning the liquid crystal molecules in a selected direction in the absence of an electric field and having a second rubbing axis which makes a selected angle with the first rubbing axis.

14. The reflective LCD of claim 13, wherein the first and second alignment layers are given with a pretilt angle of 0~10 degrees.

15. The reflective LCD of claim 14, wherein the rubbing axes of the first an second alignment layers are disposed anti-parallel each other.

16. The reflective LCD of claim 15, wherein the polarizing axis of the polarizing plate coincides with the second rubbing axis.

17. The reflective LCD of claim 16, wherein liquid crystal molecules having negative anisotropy are used when the angle between the second rubbing axis and the electric field is 0~45 degrees, and liquid crystal molecules having positive dielectric anisotropy are used when the angle between the second rubbing axis and the electric field is 45~90 degrees.

18. The reflective LCD of claim 11, wherein the counter and pixel electrodes are vertically separated by a predetermined distance.

19. A reflective LCD having high aperture ratio, high transmittance and a wide viewing angle comprising:

a lower substrate;

an upper substrate opposed to the lower substrate and being separated therefrom by a selected first distance;

a liquid crystal layer sandwiched between the lower and the upper substrates comprising a plurality of liquid crystal molecules;

a gate bus line and a data bus line formed on the lower substrate to define a pixel;

a counter electrode formed at each pixel of the lower substrate, transmitted with the common signal and having a plurality of branches diverged in parallel with the data bus line and at least a bar for connecting the branches, wherein the respective branches have a first width and are horizontally spaced and separated by a second distance;

a pixel electrode having a plurality of strips formed between the respective branches of the counter electrode, each strip having a second width and horizontally spaced apart from an adjacent strip by a third distance, and at least a bar for connecting the strips, wherein the horizontal distance between two adjacent counter and pixel electrodes is less than either the first width or the second width; and wherein the second width is smaller in length than the second distance, and the first width is smaller in length then the third distance;

a thin film transistor provided adjacent to an intersection of the gate bus line and the data bus line and transmitting a signal of the data bus line into the pixel electrode when the gate bus line is selected;

a polarizing plate disposed at an outer surface of the upper substrate;

a reflecting plate disposed at an outer surface of the lower substrate; and a quarter wave plate sandwiched between the polarizing plate an the upper substrate, wherein both counter and pixel electrodes are made of a transparent conductor, wherein the first distance between the upper and lower substrates is greater than the second distance between the branch of the counter electrode and the strip of the pixel electrode, the distance between the branch of the counter electrode and the strip of the pixel electrode is in the range of from 0.1 to 5.0 µm, and wherein the pixel and counter electrodes are capable of generating fringe field of electric field components running in horizontal and vertical directions in the liquid crystal layer to drive the liquid crystal molecules.

20. The reflective LCD of claim 19, wherein the width ratio of the second width to the first width is 0.2~5.

21. The reflective LCD of claim 20, wherein the dimensions of the first width and the second width are in the range of 2 to 8 µm.

22. The reflective LCD of claim 19, wherein the counter and pixel electrodes are vertically separated by a predetermined distance.

* * * * *